United States Patent
Dong

(10) Patent No.: US 11,507,633 B2
(45) Date of Patent: Nov. 22, 2022

(54) CARD DATA DISPLAY METHOD AND APPARATUS, AND STORAGE MEDIUM

(71) Applicant: BEIJING XIAOMI MOBILE SOFTWARE CO., LTD., Beijing (CN)

(72) Inventor: Yongqing Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 154 days.

(21) Appl. No.: 17/005,283

(22) Filed: Aug. 27, 2020

(65) Prior Publication Data

US 2021/0182348 A1  Jun. 17, 2021

(30) Foreign Application Priority Data

Dec. 11, 2019 (CN) .......................... 201911268473.9

(51) Int. Cl.
*G06F 16/00* (2019.01)
*G06F 16/953* (2019.01)
*G06F 16/9538* (2019.01)
*G06F 9/54* (2006.01)

(52) U.S. Cl.
CPC ............ *G06F 16/953* (2019.01); *G06F 9/546* (2013.01); *G06F 16/9538* (2019.01)

(58) Field of Classification Search
CPC .... G06F 16/953; G06F 9/546; G06F 16/9538; G06F 16/148
See application file for complete search history.

(56) References Cited

U.S. PATENT DOCUMENTS

| | | |
|---|---|---|
| 2012/0054167 A1* | 3/2012 | Chi ..................... G06F 16/9535 707/706 |
| 2014/0358887 A1 | 12/2014 | Morris et al. |
| 2015/0227523 A1* | 8/2015 | LeBeau ............. G06F 16/24578 707/723 |
| 2017/0097926 A1* | 4/2017 | Ben-Tzur ............ H04L 67/1097 |
| 2017/0300537 A1* | 10/2017 | Kim ........................ H04L 51/04 |
| 2019/0065044 A1* | 2/2019 | Bertoldo ................ G06F 21/316 |
| 2019/0251125 A1* | 8/2019 | Song ..................... G06F 16/906 |
| 2019/0317941 A1* | 10/2019 | Razallian ............... G06F 16/148 |
| 2019/0332612 A1 | 10/2019 | Glover et al. |
| 2022/0092969 A1* | 3/2022 | Kim ........................ G08C 23/04 |

OTHER PUBLICATIONS

Office Action issued to European Patent Application No. 20181672.5 dated Oct. 6, 2020, (7p).

* cited by examiner

*Primary Examiner* — Jared M Bibbee
(74) *Attorney, Agent, or Firm* — Arch & Lake LLP

(57) ABSTRACT

The present disclosure provides a card data display method and apparatus, and a storage medium. The method includes: in response to receiving a search request through a first application, sending the search request to a second application, acquiring card data in response to receiving the search request through the second application, in which the card data includes a first search result corresponding to the search request, and displaying the card data.

18 Claims, 14 Drawing Sheets

US 11,507,633 B2

CARD DATA DISPLAY METHOD AND APPARATUS, AND STORAGE MEDIUM

CROSS-REFERENCE TO RELATED APPLICATION

The present application is based upon and claims priority to Chinese Patent Application No. 201911268473.9, filed on Dec. 11, 2019, the entirety content of which is incorporated herein by reference.

FIELD

The present disclosure relates to the field of computer technologies, and more particularly, relates to a card data display method and apparatus, and a storage medium.

BACKGROUND

Card data refers to data displayed in the form of cards. Displaying data in the format of cards is vivid and easy for users to browse. For example, when the card data is card data of an express delivery, logistics information of the express delivery may be displayed to a user. When the card data is card data of a stock market, the current stock market may be displayed to the user.

However, the card data currently displayed on terminals is provided by operating systems of the terminals, and thus the flexibility is poor.

SUMMARY

The present disclosure provides a card data display method, a card data display apparatus, and a storage medium. The technical solutions are as follows.

According to the first aspect of the present disclosure, a card data display method is provided. The method includes: in response to receiving a search request in a first application, sending the search request to a second application; acquiring card data in the second application in response to receiving the search request, in which the card data includes a first search result corresponding to the search request; and displaying the card data.

According to the second aspect of the present disclosure, a card data display apparatus is provided. The apparatus includes: one or more processors; a memory storing instructions executable by the one or more processors; in which the one or more processors are configured to: in response to receiving a search request in a first application, send the search request to a second application; acquire card data in the second application in response to receiving the search request, in which the card data includes a first search result corresponding to the search request; and display the card data.

According to the third aspect of the present disclosure, a computer-readable storage medium having at least one instruction stored thereon is provided. The at least one instruction is loaded and executed by a processor to implement aspect card data display method, in which the method includes: in response to receiving a search request in a first application, sending the search request to a second application; acquiring card data in the second application in response to receiving the search request, the card data comprising a first search result corresponding to the search request; and displaying the card data.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Figure 1:
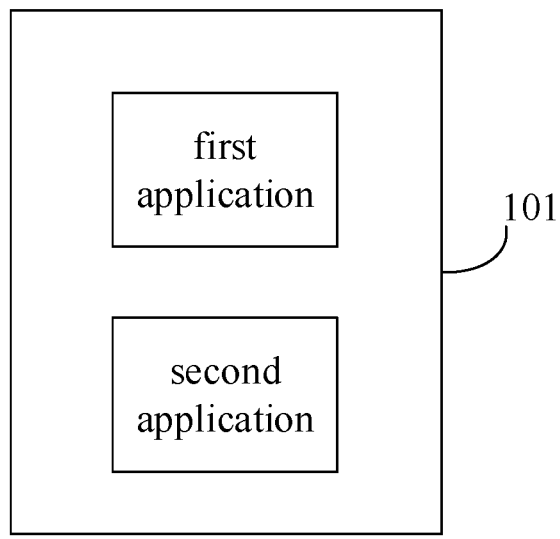
FIG. 1 is a schematic diagram of a terminal according to an example.

To make the objectives, technical solutions, and advantages of the present disclosure clearer, the examples of the present disclosure will be described in further detail below with reference to the accompanying drawings.

Beneficial effects brought by the technical solution provided in the examples of the present disclosure include at least the following.

With the method, apparatus, device, and storage medium provided by the examples of the present disclosure, in response to receiving the search request through the first application, the search request is sent to the second application. The card data is acquired in response to receiving the search request through the second application, in which the card data includes the first search result corresponding to the search request, and the card data is displayed. The present disclosure provides a manner to display the card data based on the search request. A user may trigger the search request in the first application to view the card data acquired by the second application based on the search request, which improves the flexibility of displaying the card data. In addition, the user may view the card data of the second application without manually enabling the second application, thereby simplifying operations and improving convenience.

In addition, the terminal may display the card data from the second application in the interface of the first application, which realizes the sharing of the card data, and increases the amount of information obtained by the user in the first application.

In addition, the terminal invokes the interface of the currently running quick application through the first application, sends the search request to the quick application, acquires the card data corresponding to the search request through the quick application, and displays the card data. Therefore, receiving the search request in other applications and displaying the card data of the quick application based on the search request may expand functions of the quick application, and improve the processing capability and practicability of the quick application.

In addition, terms such as "first" and "second" are used herein for purposes of description and are not intended to indicate or imply relative importance, or to implicitly show the number of technical features indicated. Thus, the feature defined with "first" and "second" may explicitly or implicitly comprise one or more this feature. In the description of the present disclosure, "a plurality of" means two or more, unless specified otherwise.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

FIG. 1 is a schematic diagram of a terminal 101 according to an example of the present disclosure. The terminal 101 may be a mobile phone, a computer, a tablet computer, a smart TV, or other types of devices. Referring to FIG. 1, the terminal 101 includes a first application and a second application. The first application may be a browser or the like, and the second application may be a takeaway application, an express delivery application, a multimedia application, or the like.

In a possible implementation, in response to receiving a search request through the first application, the terminal 101 sends the search request to the second application. The terminal 101 sends card data corresponding to the search request to the first application through the second application. The terminal 101 displays the card data on a search result interface of the first application.

In another possible implementation, when the terminal 101 receives the search request through the first application, the terminal 101 performs a search based on the search request to obtain a second search result, and displays the second search result through the search result interface of the first application. When receiving the search request through the first application, the terminal 101 sends the search request to the second application. The terminal 101 acquires the card data corresponding to the search request through the second application. The terminal 101 displays the card data through the search result interface of the second application. Furthermore, when the search result interface of the first application is in a displayed state, the terminal 101 displays the search result interface of the second application.

Figure 2:
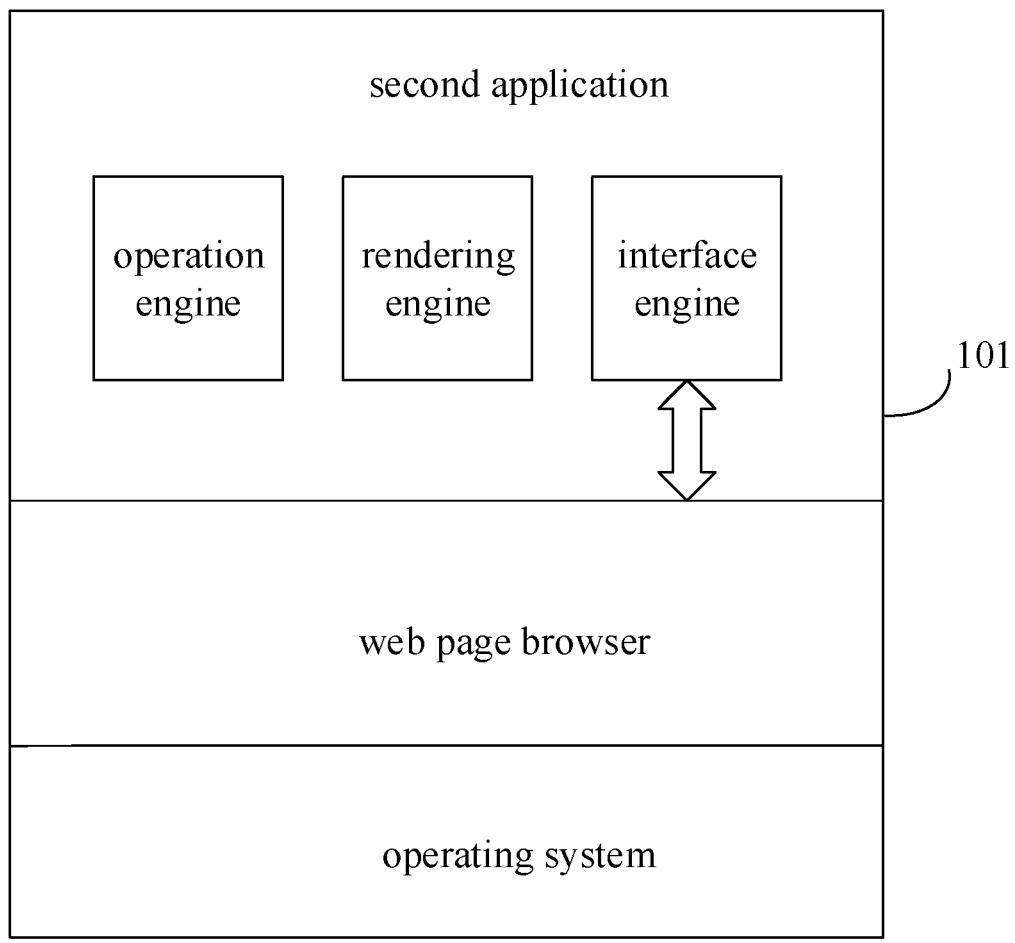
FIG. 2 is schematic diagram of a terminal according to another exemplary example.

FIG. 2 is schematic diagram of the terminal 101 according to another example of the present disclosure. The first application is a web browser. As illustrated in FIG. 2, the terminal 101 includes an operating system, a web browser, and a second application. The second application includes an operation engine, a rendering engine, and an interface engine. The operation engine and the rendering engine of the second application are adapted to the web browser, and may interact with the web browser through the interface engine to implement the card data display method provided by the example of the present disclosure.

The operation engine is configured to run JS (JavaScript, a programming language) files, etc. The rendering engine is configured to render an interface based on the card data. The interface engine is configured to provide capabilities of an interface, such as implementing registering, logging in, storage, data request and other functions through the interface engine, and may implement data interactions between the web browser and the second application.

Figure 3:
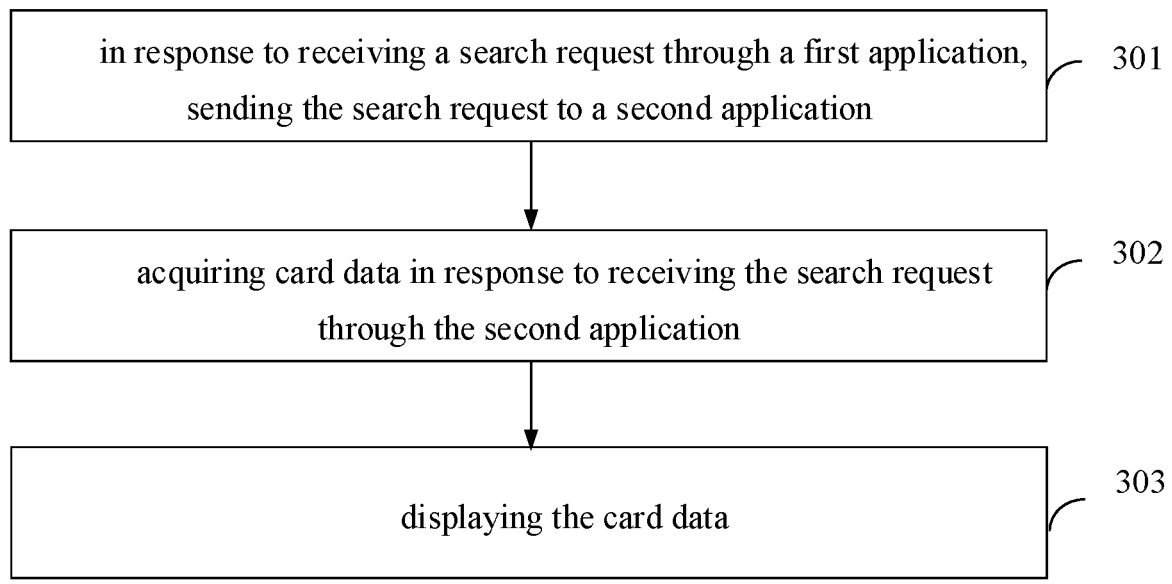
FIG. 3 is a flowchart of a card data display method according to an example.

FIG. 3 is a flowchart of a card data display method according to an example. The method is applied to a terminal. Referring to FIG. 3, the method includes the followings.

At block 301, in response to receiving a search request through a first application, the search request is sent to a second application.

At block 302, card data is acquired in response to receiving the search request through the second application.

The card data includes a first search result corresponding to the search request.

At block 303, the card data is displayed.

In the method provided by the example of the present disclosure, in response to receiving the search request through the first application, the terminal sends the search request to the second application. In response to receiving the search request through the second application, the terminal acquires the card data and displays the card data. The example of the present disclosure provides a manner to display the card data based on the search request. The user may trigger the search request in the first application to view the card data acquired by the second application based on the search request, which improves the flexibility of displaying the card data. In addition, the user may view the card data of the second application without manually enabling the second application, thereby simplifying operations and improving convenience.

In a possible implementation, displaying the card data includes: sending the card data to the first application through the second application, and in response to receiving the card data through the first application, displaying the card data.

In another possible implementation, in response to receiving the card data through the first application, displaying the card data includes, in response to receiving the card data through the first application, performing rendering based on the card data to obtain a first search result interface, and displaying the first search result interface.

In another possible implementation, the method further includes, in response to receiving the search request through the first application, performing searching based on the search request to obtain a second search result. In response to receiving the card data through the first application, displaying the card data includes performing rendering based on the card data and the second search result to obtain a second search result interface, and displaying the second search result interface.

In another possible implementation, the second application is a quick application. In response to receiving the search request through the first application, sending the search request to the second application includes invoking an interface provided by the quick application through the first application, and sending the search request to the quick application.

In another possible implementation, the search request carries a search keyword, and the card data includes the first search result corresponding to the search keyword; or, the search request carries a user identifier for logging in to the first application and the search keyword, and the card data includes the user identifier and the first search result corresponding to the search keyword.

In another possible implementation, in response to receiving the search request through the first application, sending the search request to the second application includes, in response to receiving the search request through the first application, determining the second application associated with the search keyword, and sending the search request to the second application.

In another possible implementation, the method further includes: in response to receiving the search request through the first application, performing searching based on the search request to obtain a second search result; and performing rendering based on the second search result to obtain a third search result interface, and displaying the third search result interface. Displaying the card data includes performing, through the second application, the rendering based on the card data to obtain a fourth search result interface, and in response to the third search result interface being in a displayed state, displaying the fourth search result interface.

In another possible implementation, the third search result interface includes a hollow area, and the fourth search result interface is located in the hollow area; or, the fourth search result interface is suspended over the third search result interface and blocks a designated area of the third search result interface. For example, when the hollow area does not exist, the fourth search result interface is suspended over the third search result interface.

Figure 4:
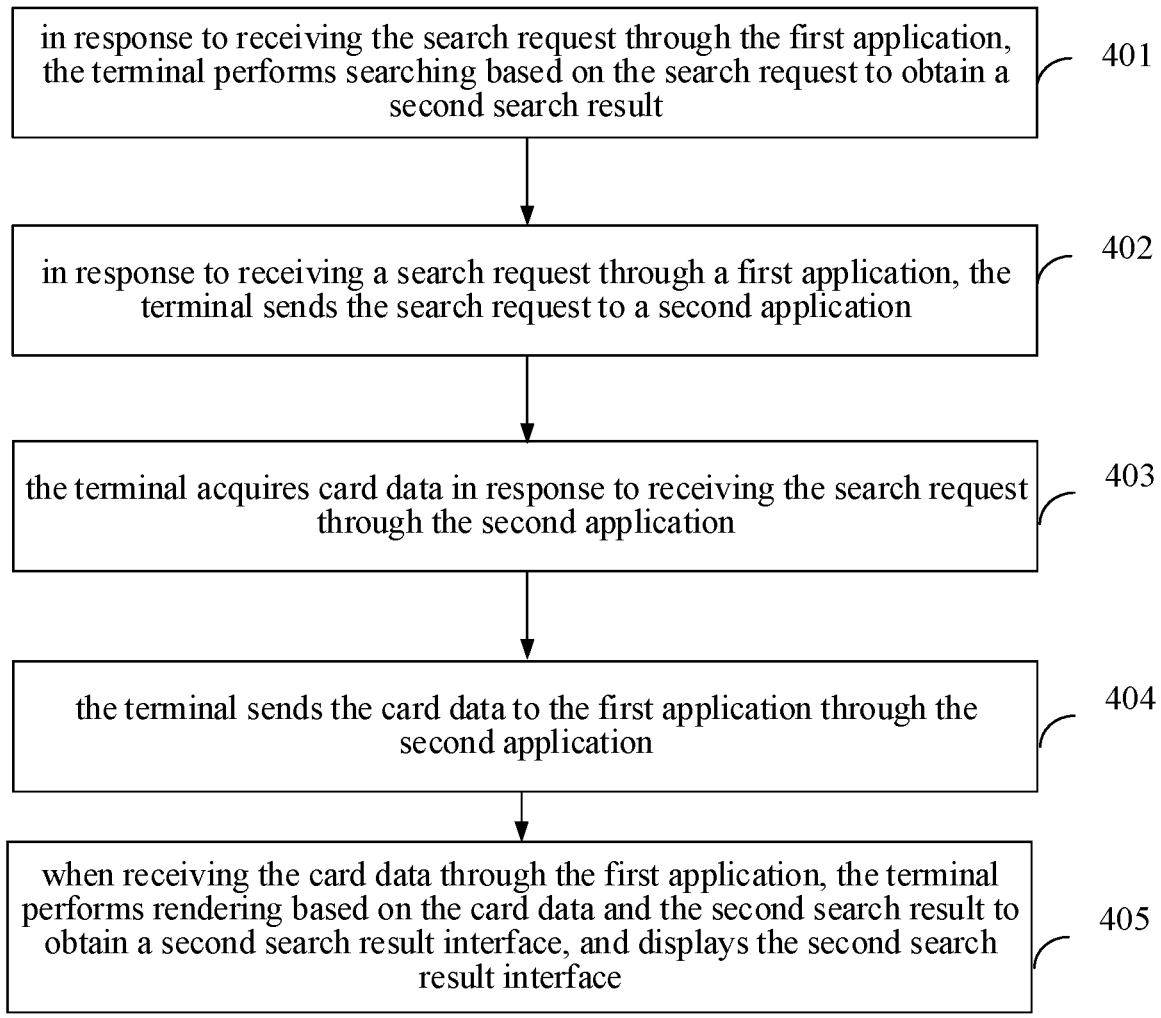
FIG. 4 is flowchart of a card data display method according to another example.

FIG. 4 is flowchart of a card data display method according to another example, which is applied to the terminal. Referring to FIG. 4, the method includes the followings.

At block 401, in response to receiving the search request through the first application, the terminal performs searching based on the search request to obtain a second search result.

The first application is installed on the terminal, and the first application is an application having a search function, such as a browser.

When the user needs to query certain information, such as takeaway information, movie information, weather information, etc., the search request may be triggered on the first application through the terminal. When the terminal receives the search request through the first application, the search is performed based on the search request, and thus the second search result is obtained.

The search request is configured to instruct the terminal to search through the first application. The second search result may include text data, picture data, audio data, video data, and so on.

In a possible implementation, the terminal displays a search interface of the first application. The search interface includes an input box and a search button. The user enters a search keyword in the input box and triggers a search button. When the terminal detects a trigger operation on the search button, the terminal determines that the search request is received, in which the search request carries the search keyword. The search interface is an interface with a search function, such as the main interface of the first application or an interface specifically used for searching in the first application. The trigger operation on the search button may be a click operation, a long-press operation, a slide operation, and the like. The search keyword may include Chinese characters, English characters or punctuation marks.

For example, the user enters the search keyword "movie" in the input box, and the terminal performs searching based on the search keyword "movie" to obtain the first search result. The first search result includes a currently-released movie, types of movie player software, links of movie player websites, movie reviews, movie clips, and so on.

At block 402, in response to receiving a search request through a first application, the terminal sends the search request to a second application.

The second application is also installed on the terminal. The second application may be various types of applications such as an express delivery application, a takeaway application, a weather application, and a multimedia application.

When the terminal receives the search request through the first application, the terminal sends the search request to the second application to instruct the terminal to perform searching based on the search request through the second application.

In a possible implementation, the second application is a quick application running on the terminal. An interface provided by the quick application is invoked through the first application, and the search request is sent to the quick application.

The quick application, an application which could run without installation, runs based on a native application program interface (API) provided by the operating system of the electronic device. The quick application provides an interface for the first application, and the terminal may invoke the interface based on the search request to send the search request to the quick application.

In another possible implementation, the terminal includes the first application and a plurality of other applications. When the terminal receives the search request through the first application, the second application associated with the search keyword is determined among the plurality of other applications, and the search request is sent to the second application. The second application performs a search based on the search request.

The plurality of other applications on the terminal has their respective type tags. The type tags are configured to describe types of the applications. Upon receiving the search request through the first application, the terminal acquires the search keyword carried by the search request, and determines a type tag associated with the search keyword from the plurality of type tags, and determines the application corresponding to the type tag as the second application.

For example, the first application is a browser, and the terminal also includes three other applications, which are a takeaway application, a schedule planning application, and a stock application, respectively. The type tag corresponding to the takeaway application is "takeaway", the type tag corresponding to the schedule planning application is "schedule", and the type tag corresponding to the stock application is "stock". When the user opens the browser and enters "stock" in the search box of the browser, the search button is triggered. When the terminal detects the trigger operation on the search button through the browser and receives the search request, the terminal acquires the search keyword "stock", determines that the search keyword "stock" is associated with the type tag "stock", and regards the stock application corresponding to the type tag "stock" as the second application. The terminal sends the search request to the stock application through the browser.

At block 403, the terminal acquires card data in response to receiving the search request through the second application.

The terminal receives the search request through the second application, and acquires the first search result corresponding to the search request through the second application, determines display style data corresponding to the first search result, and performs rendering based on the first search result and the display style data to obtain the card data.

The card data refers to data displayed in the form of a card. The card data is displayed in a box shape, such as a rectangle or a square. The box displays the content included in the card data, that is, the first search result. The first search result may include text data, picture data, audio data, video data, and the like. The display style data may include text color, background color, icon style, border style, and the like.

In a possible implementation, the terminal forwards the search request to a server associated with the second application through the second application. When receiving the search request, the server performs a search based on the search request to obtain the first search result, determines the display style data corresponding to the first search result, and sends the first search result and the display style data to the terminal. The terminal receives the first search result and the display style data through the second application, and performs rendering based on the first search result and the display style data to obtain the card data.

In another possible implementation, the search request carries the search keyword. When the terminal receives the search request through the second application, the terminal obtains the search keyword carried in the search request, and obtains the first search result corresponding to the search keyword. The first search result corresponding to the search keyword is used as the card data.

For example, if the search keyword is "stock", the first search result is market data of the current stock; if the search keyword is "weather", the first search result is weather forecast data in a week; and if the search keyword is "movie", the first search result is data of movies currently being shown.

In another possible implementation, the terminal logs in to the first application based on the user identifier, and displays the search interface of the first application. When the user enters the search keyword in the input box, the search button is triggered. When the terminal detects the trigger operation on the search button, it is determined that the search request is received. The search request carries the search keyword, and the user identifier currently logged in to the first application.

When the terminal receives the search request through the second application, the terminal acquires the user identifier carried by the search request and the search keyword, logs in to the second application based on the user identifier, acquires the first search result corresponding to the user identifier and the search keyword, and uses the first search result as the card data.

The user identifier is configured to indicate the identity of the user of the terminal. The user identifier may be a user account, a phone number, a user nickname, an e-mail address, and the like.

For example, if the search keyword is "takeaway", the first search result is historical takeaway order data of the user identifier; if the search keyword is "express delivery", the first search result is logistics data of the user identifier; and if the search keywords is "schedule planning", the first search result is today's schedule planning data of the user identifier.

At block 404, the terminal sends the card data to the first application through the second application.

The terminal acquires the card data corresponding to the search request through the second application. Since the search request is received by the terminal through the first application, a response result of the search request needs to be displayed in the first application, that is, the card data corresponding to the search request needs to be displayed in the first application. Therefore, the terminal sends the card data to the first application through the second application.

In a possible implementation, the second application is the quick application running on the terminal. The interface provided by the first application is invoked through the quick application to send the card data to the first application.

At block 405, when receiving the card data through the first application, the terminal performs rendering based on the card data and the second search result to obtain a second search result interface, and displays the second search result interface.

When the terminal receives the card data through the first application, rendering is performed, through the rendering engine, based on the card data and the second search result to obtain the second search result interface. The second search result interface is displayed through the first application.

The rendering engine, also known as a template engine, is configured to perform rendering based on acquired loading data, style data, and structural data to obtain a rendered page. The loading data may be HTML (hypertext markup language) files, and the style data and structural data may be CSS (cascading style sheets) files. In the example of the present disclosure, the loading data is the first search result and the second search result.

Figure 5:
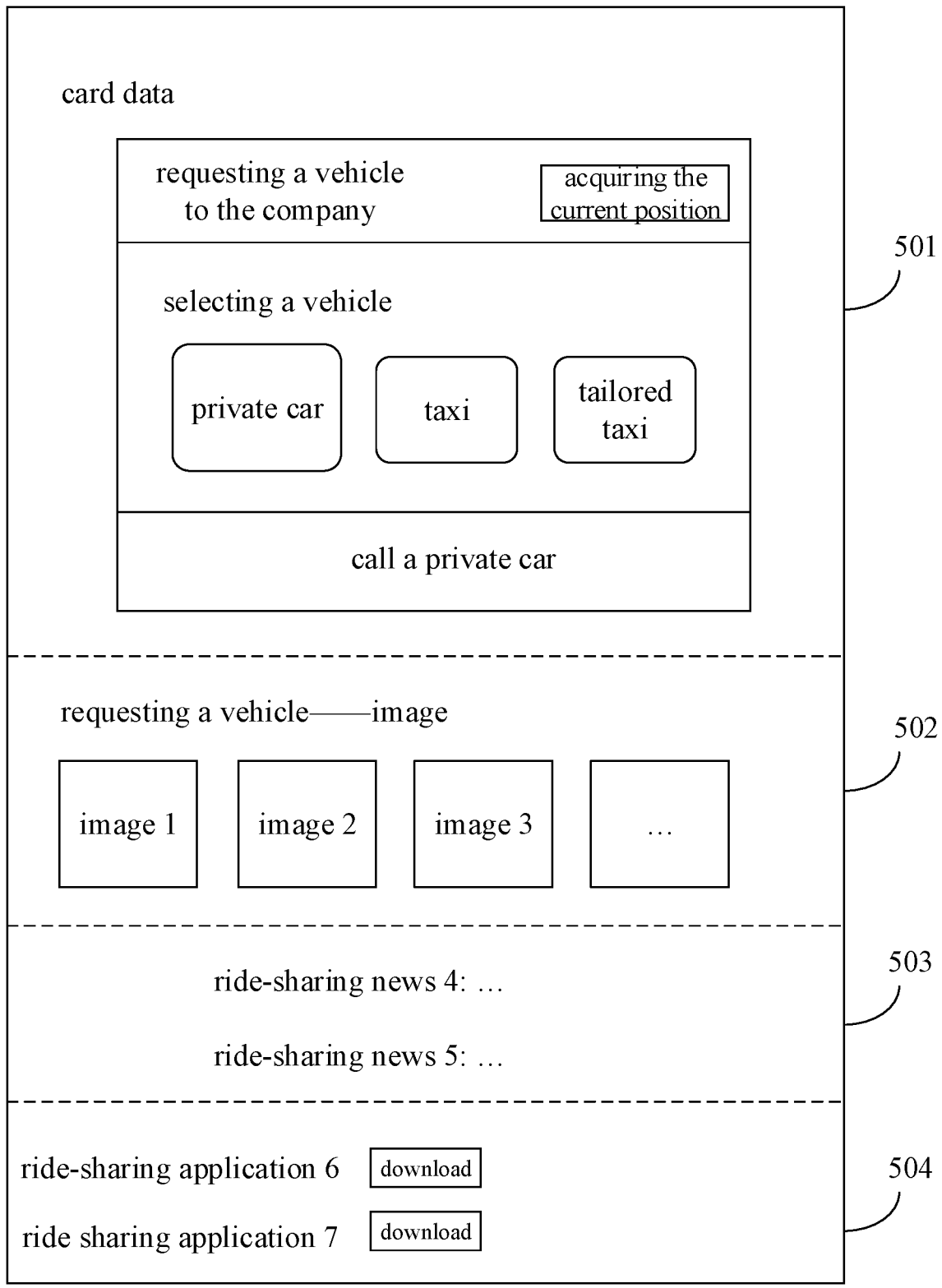
FIG. 5 is a schematic diagram of a second search result interface according to an example.

FIG. 5 is a schematic diagram of a second search result interface according to an example of the present disclosure. When the search keyword is "ride sharing" (known as requesting a vehicle), the second search result is the search result obtained by searching for "ride sharing" in the first application, and the card data is data returned by a ride sharing application (the second application). The terminal renders the card data and the second search result through the first application to obtain the second search result interface. Referring to FIG. 5, the second search result interface includes a first area 501, a second area 502, a third area 503, and a fourth area 504. The first area 501 displays the card data, and includes service types, three types of vehicles for the user to select, a position acquisition button, and a call button. The service type is "requesting a vehicle to the company", the three types of vehicles are "private car", "taxi" and "tailored taxi", the position acquisition button "acquiring the current position" is configured to locate the current position of the terminal, and the call button "call a tailored taxi" is configured to trigger a request to call a tailored taxi. The second area 502, the third area 503, and the fourth area 504 display the second search result, in which the second area 502 displays picture data about requesting a vehicle, the third area 503 displays news data about requesting a vehicle, and the fourth area 504 displays applications related to requesting a vehicle.

In addition, when the terminal displays the second search result interface through the first application, the user may acquire information about requesting a vehicle based on the second search result interface, and may also request the terminal to provide corresponding services based on the trigger operation in the second search result interface.

For example, when the user triggers the call button "call a private car" in the first area 501 in the second search result interface, the terminal receives the request "call a private car" (for example, those private cars provides carpooling service) through the first application, and then sends the request "call a private car" to the second application through the first application. When the terminal receives the request "call a private car" through the second application, the terminal returns a response result to the first application. Alternatively, when the terminal receives the request "call a private car" through the first application, the terminal responds to the request "call a private car" through the first application.

For example, when the user triggers a download button "download" corresponding to a ride sharing application 6 in the fourth area 504 in the second search result interface, the terminal receives the download request through the first application, and then downloads the ride sharing application 6 corresponding to the download request through the first application.

Figure 6:
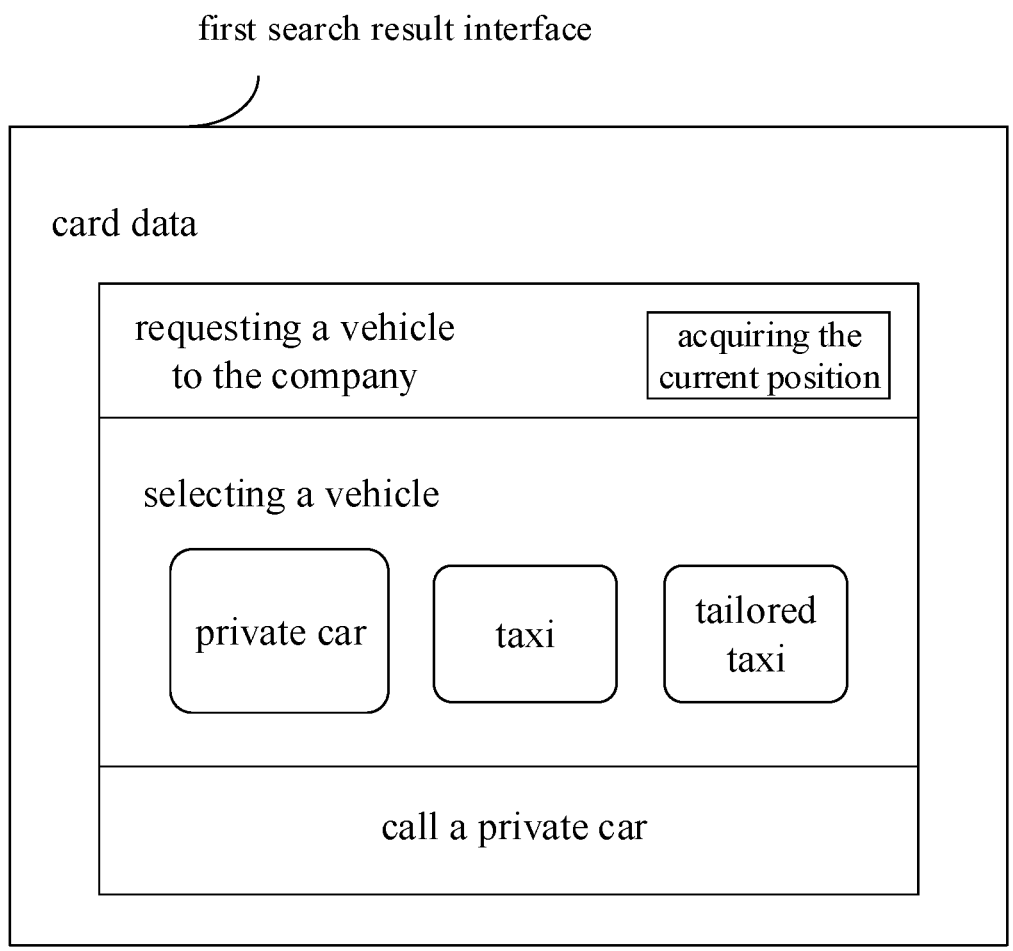
FIG. 6 is a schematic diagram of a first search result interface according to an example.

It should be noted that the example of the present disclosure is exemplarily described by performing the steps in block 401 before block 402. In another example, block 402 may be performed before block 401. Optionally, in another example, block 401 may not be performed. At block 405, when the terminal receives the card data through the first application, the terminal only performs rendering based on the card data to obtain the first search result interface, and displays the first search results interface. The first search result interface is illustrated in FIG. 6. The first search result interface is similar to the first area 501 in the second search interface illustrated in FIG. 5 described above, and details will not be described herein again.

It should be noted that the example of the present disclosure relates to the first search result interface and the second search result interface. The first search result interface and the second search result interface both belong to the interfaces of the first application. The first search result interface displays the card data of the second application, and the second search result interface displays the second search result of the first application and the card data of the second application.

In the method provided by the example of the present disclosure, in response to receiving the search request through the first application, the terminal sends the search request to the second application. In response to receiving the search request through the second application, the terminal acquires the card data and displays the card data. Examples of the present disclosure provide a manner to display the card data based on the search request. The user may trigger the search request in the first application to view the card data acquired by the second application based on the search request, which improves the flexibility of displaying the card data. In addition, the user may view the card data of the second application without manually enabling the second application, thereby simplifying operations and improving convenience.

In addition, the terminal may display the card data from the second application in the interface of the first application, thereby realizing the sharing of the card data, and increasing the amount of information acquired by the user in the first application.

In addition, the terminal invokes the interface of the currently running quick application through the first application, sends the search request to the quick application, acquires the card data corresponding to the search request through the quick application, and displays the card data. Therefore, receiving the search request in other applications and displaying the card data of the quick application based on the search request may expand functions of the quick application, and improve the processing capability and practicability of the quick application.

Figure 7:
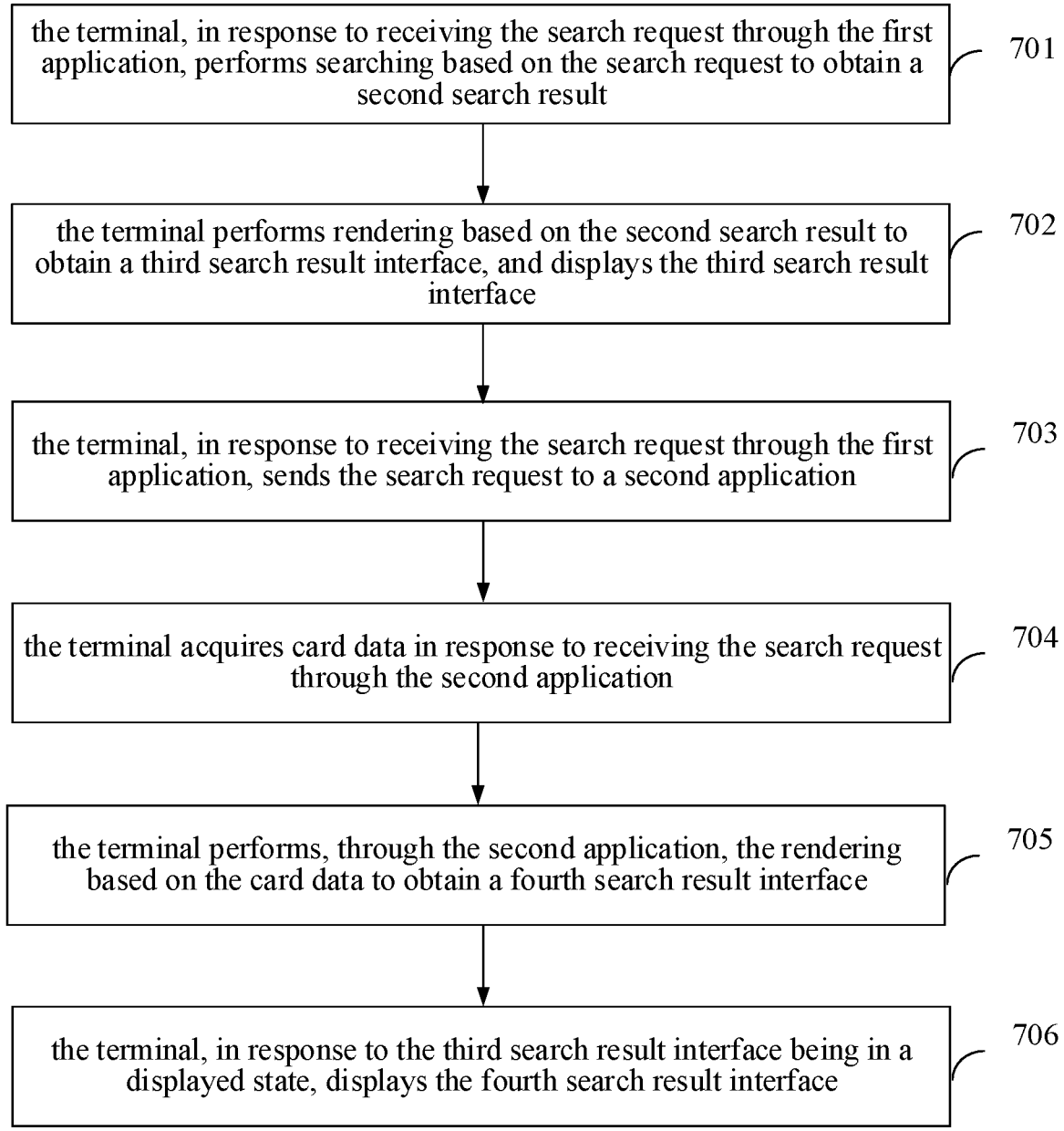
FIG. 7 is flowchart of a card data display method according to yet another example.

FIG. 7 is a flowchart of a card data display method according to yet another example. The method is applied to the terminal. Referring to FIG. 7, the method includes the followings.

At block 701, the terminal, in response to receiving the search request through the first application, performs searching based on the search request to obtain a second search result.

The step at block 701 is similar to that at block 401 described above, and details will not be described herein again.

At block 702, the terminal performs rendering based on the second search result to obtain a third search result interface, and displays the third search result interface.

When the terminal obtains the second search result, the terminal performs rendering based on the second search result through the rendering engine to obtain the third search result interface, and displays the third search result interface through the first application.

Figure 8:
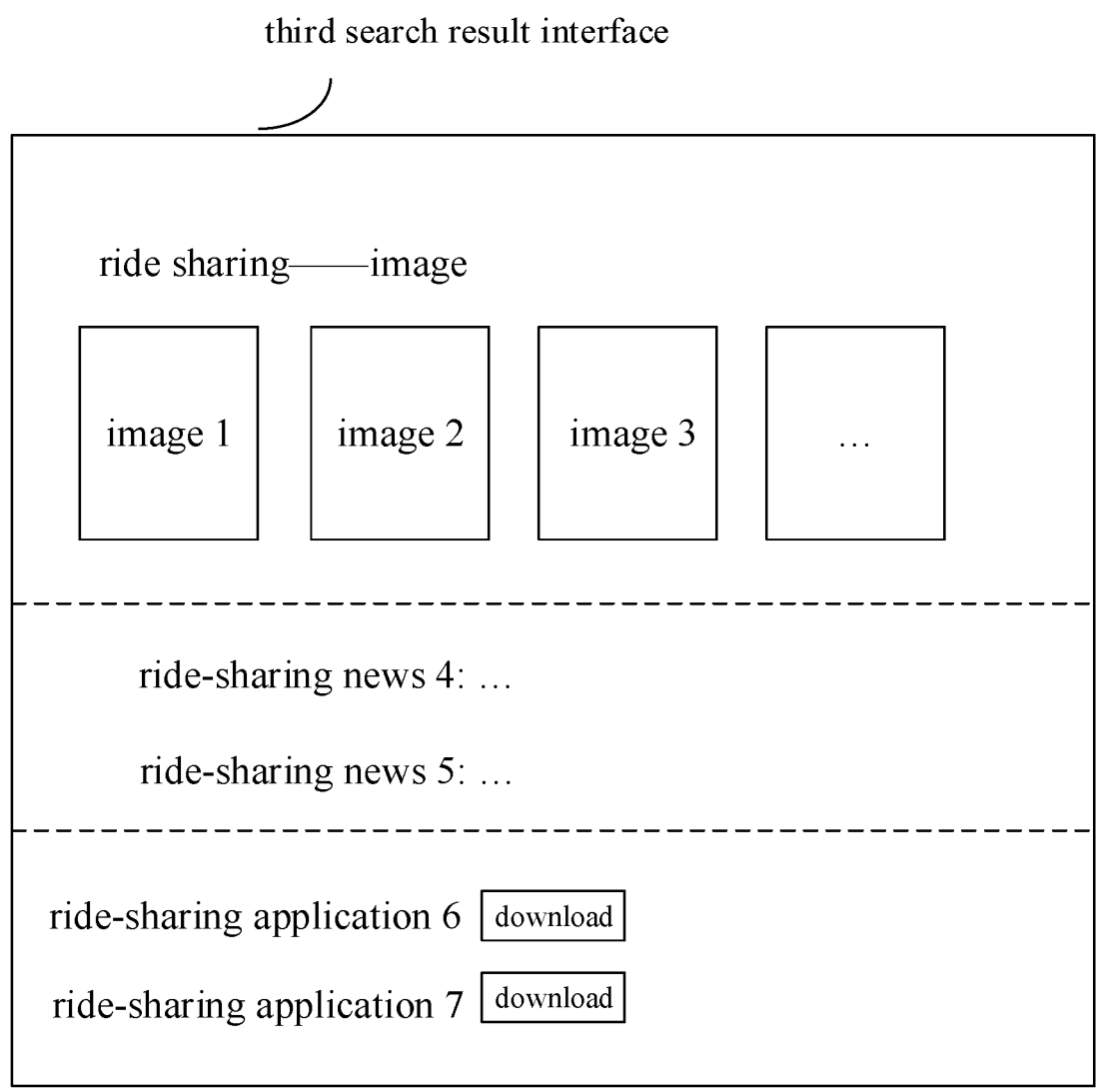
FIG. 8 is a schematic diagram of a third search result interface according to an example.

FIG. 8 is a schematic diagram of a third search result interface according to an example of the present disclosure. The third search interface illustrated in FIG. 8 is similar to the second area 502, the third area 503, and the fourth area 504 in the second search interface illustrated in FIG. 5, and details will not be described herein again.

At block 703, the terminal, in response to receiving the search request through the first application, sends the search request to a second application.

The step at block 703 is similar to that at block 402 described above, and details will not be described herein again.

At block 704, the terminal acquires card data in response to receiving the search request through the second application.

The card data includes the first search result corresponding to the search request.

The step at block 704 is similar to that at block 403 described above, and details will not be described herein again.

At block 705, the terminal performs, through the second application, the rendering based on the card data to obtain a fourth search result interface.

When the terminal acquires the card data through the second application, the terminal performs the rendering based on the card data through the second application to obtain the fourth search result interface, and displays the fourth search result interface through the second application.

Figure 9:
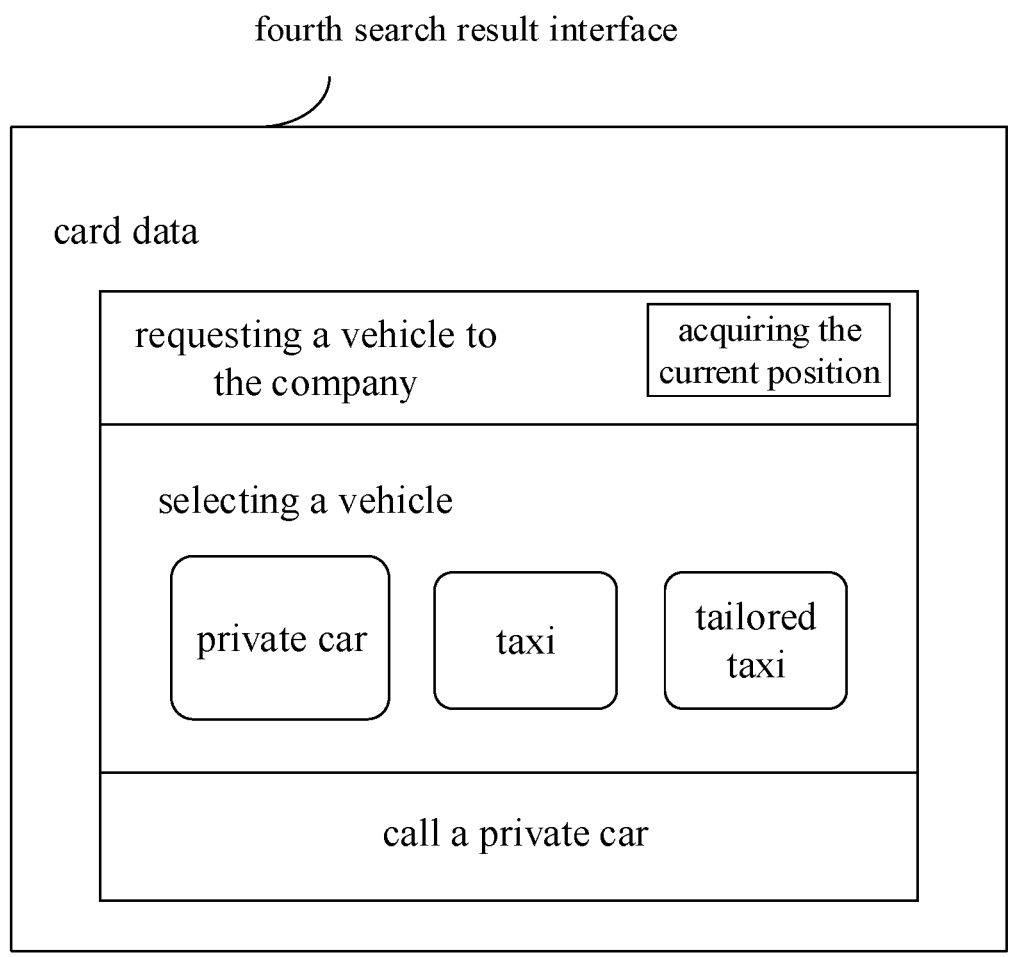
FIG. 9 is a schematic diagram of a fourth search result interface according to an example.

FIG. 9 is a schematic diagram of a fourth search result interface according to an example of the present disclosure. The fourth search interface illustrated in FIG. 9 is similar to the first area 501 in the second search interface illustrated in FIG. 5 described above, and thus will not be repeated here.

At block 706, the terminal, in response to the third search result interface being in a displayed state, displays the fourth search result interface.

When obtaining the third search result interface and the fourth search result interface, the terminal displays the fourth search result interface when the third search result interface is in the displayed state, that is, the terminal simultaneously displays the third search interface of the first application and the fourth search interface of the second application.

In a possible implementation, the third search result interface includes a hollow area, and the fourth search result interface is located in the hollow area.

The hollow area in the third search result interface does not display any information, and is only used to display the fourth search result interface of the second application to display the card data to the user. Position data and size data of the hollow area may be set by the terminal by default, or may be set by the user through the terminal.

Through the first application, the terminal sets the position data and size data of the hollow area in the third search result interface, and sends the position data and size data to the second application. The second application performs the rendering based on the position data, size data, and card data to obtain the fourth search result interface corresponding to the position data and size data of the hollow area. The terminal may display the fourth search result interface in the hollow area of the third search result interface through the second application.

The user may perform operations in the third search interface and the fourth search interface, such as a click operation, a slide operation, a drag operation, and the like. When the terminal detects that the user performs an operation in the hollow area of the third search result interface, the terminal responds to the operation through the second application. When the terminal detects that the user performs an operation in an area other than the hollow area of the third search result interface, the terminal responds to the operation through the first application.

The user may adjust the size of the third search result interface based on the first application. If the size of the third search result interface changes, the position of the third search result interface also changes. Therefore, when changes in the position and size of the third search result interface are detected through the first application, the terminal may reset the position data and size data of the hollow area based on the changes in the position and size of the third search result interface, and sends the updated position data and size data to the second application. When the terminal receives the updated position data and size data through the second application, the terminal adjusts the position and size of the fourth search result interface correspondingly based on the updated position data and size data, so that the fourth search result interface is still displayed in the hollow area.

Alternatively, the user may adjust only the position of the third search result interface based on the first application. When the terminal detects that the position of the third search result interface changes through the first application, the terminal may reset the position data of the hollow area based on the change in the position of the third search result interface, and send the updated position data to the second application. Consequently, when the terminal receives the updated position data through the second application, the terminal adjusts the position of the fourth search result interface correspondingly based on the updated position data, so that the fourth search result interface is still displayed in the hollow area.

In another possible implementation, the fourth search result interface is suspended over the third search result interface and blocks a designated area of the third search result interface.

The designated area in the third search result interface does not display any information. The designated area is configured to display the fourth search result interface of the second application, and to display the card data to the user. The position data and size data of the designated area may be set by the terminal by default, or set by the user through the terminal. Alternatively, the designated area may further display content in the third search result interface.

The terminal sets the position data and size data of the designated area of the third search result interface through the first application, and sends the position data and size data to the second application. The second application performs the rendering based on the position data, size data, and card data to obtain the fourth search result interface corresponding to the position data and size data of the designated area. Then, the terminal may suspend the fourth search result interface over the third search result interface through the second application, and block the designated area of the third search result interface.

The user may perform operations in the third search interface and the fourth search interface, such as the click operation, the slide operation, the drag operation, and the like. When the terminal detects that the user performs an operation in the designated area of the third search result interface, the terminal responds to the operation through the second application. When the terminal detects that the user performs an operation in an area other than the designated area of the third search result interface, the terminal responds to the operation through the first application. The user may adjust the size of the third search result interface based on the first application. If the size of the third search result interface changes, the position of the third search result interface also changes. Therefore, when the terminal detects changes in the position and size of the third search result interface through the first application, the terminal may reset the position data and size data of the designated area based on the changes in the position and size of the third search result interface, and send the updated position data and size data to the second application. When the terminal receives the updated position data and size data through the second application, the terminal adjusts the position and size of the fourth search result interface correspondingly based on the updated position data and size data, so that the fourth search result interface is still displayed in the designated area.

Alternatively, the user may adjust the position of the fourth search result interface based on the second application. When the terminal detects a change in the position of the fourth search result interface through the second application, the terminal may reset the position data of the fourth search result interface based on the change in the position of the fourth search result interface, and send the updated position data to the first application. When the terminal receives the updated position data through the first application, the terminal adjusts the position of the information displayed in the third search result interface based on the updated position data to obtain the updated designated area, such that the fourth search result interface blocks the updated designated area.

For example, when the user needs to adjust the position of the fourth search result interface, the fourth search result interface may be dragged to another position in the third search result interface. When the terminal detects the drag operation of the user through the second application, the terminal acquires the position data of the fourth search result interface based on the drag operation, and sends the updated position data to the first application. When the terminal receives the updated position data through the first application, the terminal adjusts the position of the information displayed in the third search result interface, so that no information is displayed in the area corresponding to the position data, that is, the area corresponding to the position data is determined as the designated area.

Figure 10:
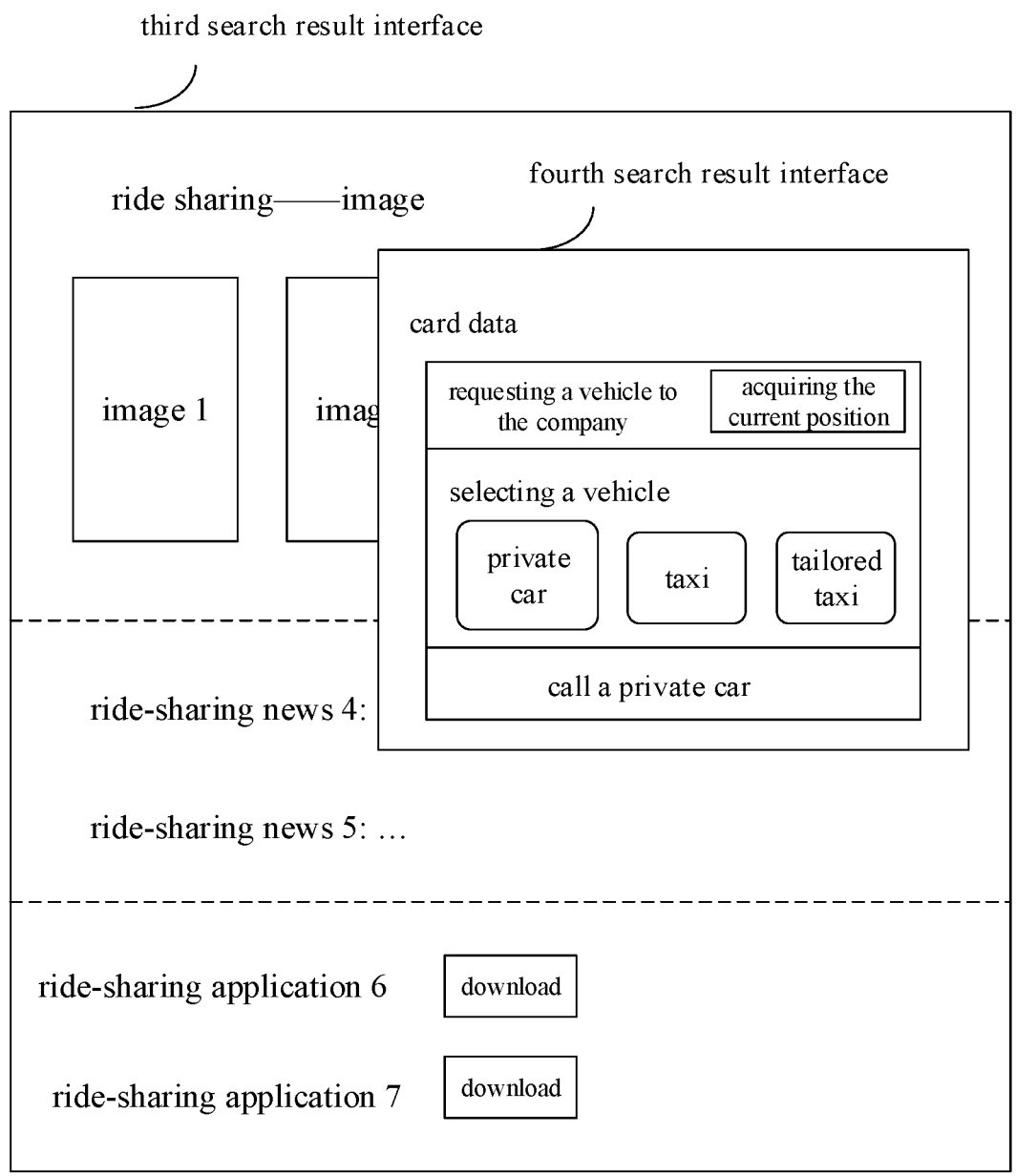
FIG. 10 is a schematic diagram of another search result interface according to an example.

As shown in FIG. 10, the second search result of the first application is displayed on the third search result interface, and the card data of the second application is displayed on the fourth search result interface. The fourth search result interface is suspended over the designated area in the third search result interface, and blocks part of the second search result in the third search result interface.

It should be noted that the example of the present disclosure relates to the third search result interface and the fourth search result interface. The third search result interface belongs to the interface of the first application, and displays the second search result of the first application. The fourth search result interface belongs to the interface of the second application and displays the card data of the second application.

In the method provided by the example of the present disclosure, in response to receiving the search request through the first application, the terminal sends the search request to the second application. In response to receiving the search request through the second application, the terminal acquires the card data and displays the card data. Examples of the present disclosure provide a manner to display the card data based on the search request. The user may trigger the search request in the first application to view the card data acquired by the second application based on the search request, which improves the flexibility of displaying the card data. In addition, the user may view the card data of the second application without manually enabling the second application, thereby simplifying operations and improving convenience.

In an application scenario provided by an example of the present disclosure, the first application is a browser, and the second application is a takeaway quick application. The card data of the takeaway quick application may be displayed in the browser.

Figure 11:
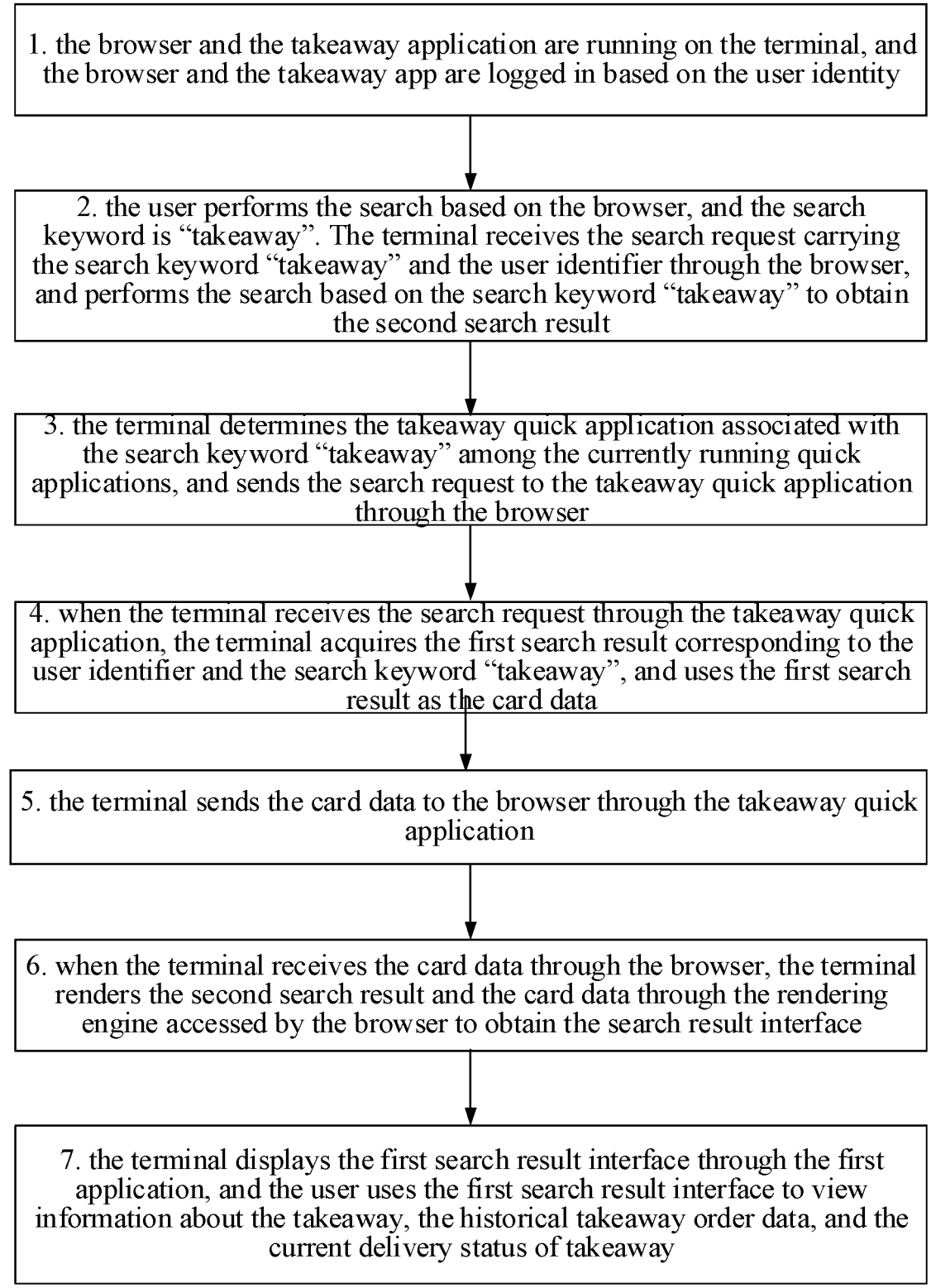
FIG. 11 is flowchart of a card data display method according to still yet another example.

How the terminal displays the card data is illustrated in the flowchart as shown in FIG. 11. The process includes the followings.

1. The browser and the takeaway application are running on the terminal, and the browser and the takeaway app are logged in based on the user identity.

2. The user performs the search based on the browser, and the search keyword is "takeaway". The terminal receives the search request carrying the search keyword "takeaway" and the user identifier through the browser, and performs the search based on the search keyword "takeaway" to obtain the second search result.

The second search result includes definitions, pictures, news, applications, reports, etc. regarding takeaways.

3. The terminal determines the takeaway quick application associated with the search keyword "takeaway" among the currently running quick applications, and sends the search request to the takeaway quick application through the browser.

4. When the terminal receives the search request through the takeaway quick application, the terminal acquires the first search result corresponding to the user identifier and the search keyword "takeaway", and uses the first search result as the card data.

The first search result includes the historical takeaway order data corresponding to the user identifier and the current delivery status of the takeaway.

5. The terminal sends the card data to the browser through the takeaway quick application.

6. When the terminal receives the card data through the browser, the terminal renders the second search result and the card data through the rendering engine accessed by the browser to obtain the search result interface.

The search result interface includes the definitions, pictures, news, applications, reports, etc. regarding the takeaway, the historical takeaway order data corresponding to the user identifier and the current delivery status of the takeaway.

7. The terminal displays the first search result interface through the first application, and the user uses the first search result interface to view information about the takeaway, the historical takeaway order data, and the current delivery status of takeaway.

The quick application involved in the examples of the present disclosure is a new form of application based on a hardware platform of the electronic device, and may run based on the native API (Application Programming Interface) provided by the operating system.

Quick applications are developed based on a unified standard, and feature native rendering, no installation, click-to-run, and native application experience (performance, system integration, interaction, etc.). The frameworks of the quick applications may be deeply integrated into the operating system, and may operate at the operating system level to achieve seamless connection with other application services. Developers may achieve that the quick applications may be run on different types of electronic devices with one-time development. At the beginning of the development of the quick applications, the standard is unified among electronic device manufacturers in terms of the development specifications, capability access, and developer services, which greatly reduce adaptation costs for developers.

Compared with traditional applications, quick applications have the following characteristics:

instant: click-to-run, and the user does not need to wait;

everywhere: the quick applications are deeply integrated with use scenarios of the electronic device, and of which entrances are everywhere, such as search engines, smart assistants, smart recommendations, application markets, browsers, etc.; and efficient: the quasi-front-end development method has a high efficiency.

Figure 12:
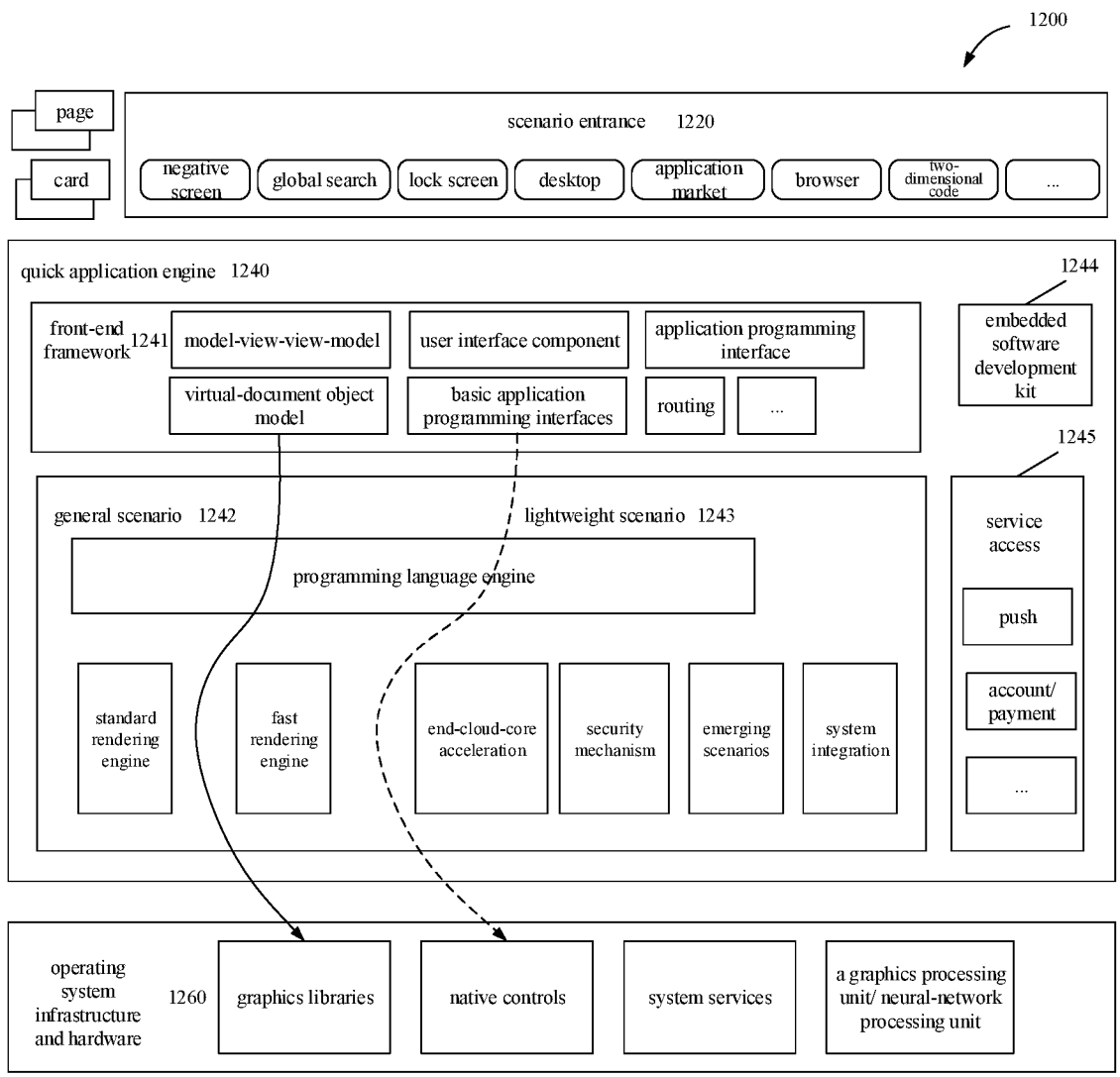
FIG. 12 is a block diagram of a framework of a quick application according to an example.

FIG. 12 is a block diagram of a framework 1200 of a quick application according to an example of the present disclosure. The framework of the quick application includes a scenario entrance 1220, a quick application engine 1240, an operating system (OS) infrastructure and hardware 1260.

The scenario entrance 1220 includes at least one of a negative screen (a page displayed by left sliding on the home page, also called as left-most screen), a global search, a lock screen, a desktop, an application market, a browser, and a two-dimensional code. The external presentation form of the scenario entrance 1220 may be a page form or a card form.

The quick application engine 1240 includes a front-end framework 1241, a general scenario 1242, a lightweight scenario 1243, an embedded software development kit (SDK) 1244, and a service access 1245.

The front-end framework 1241 includes a model-view-view-model (MVVM), a virtual-document object model (V-DOM), routing, basic APIs, business APIs, user interface (UI) components, and so on.

The general scenario 1242 and lightweight scenario 1243 include JavaScript (JS, a programming language engine, a standard rendering engine, a fast rendering engine, end-cloud-core acceleration, a security mechanism, emerging scenarios such as artificial intelligence (AI), augmented reality (AR), system integration (application management, right management, etc.).

The service access 1245 includes push, account/payment, etc.

The OS infrastructure and hardware 1260 include: graphics libraries, native controls, system services, and a graphics processing unit (GPU)/neural-network processing unit (NPU).

From the perspective of the execution path, there are methods such as universal Web (World Wide Web) scenarios supported by standard HTML (hypertext markup language), and a combination of JS and native, which support a lighter and faster experience.

The following will briefly introduce the architecture of the quick application engine from three aspects.

1) Application development

The front-end design of the quick application borrows and integrates design ideas of mainstream front-end frameworks. The application is built in a componentized way, the pattern is designed with the MVVM with data binding as the core, and the V-DOM method is used to improve performance. At the same time, a simple and clear Vue-like (virtual machine unpack engine) template is selected. In addition, the layout is simplified accordingly. From the perspective of a new application form, native UI mapping, and open capabilities, a set of components and API specifications need to be defined to facilitate the development of such quick applications.

2) System integration

The quick application, as a complete application form, may be deeply integrated with the system, run and interact with the system like a native application. There are currently two forms of quick application: a stand-alone application form in a full screen mode and a card form in an embedded mode. In the stand-alone application form, the quick application is like a native application, which has complete lifecycle management, page management, routing, and the like. The quick application may be parasitic in Android's activity, the page is parasitic in fragment, and the instance is controlled by an independent background service. The card form is another form, which is embedded into each corner of the system as an independent local control through the embedded SDK, and displays dynamic content in a lightweight manner. In terms of security isolation, better security may be achieved through the sandbox mechanism, process isolation, permission control, and the support of the operating system layer.

3) Performance experience and emerging scenarios, such as the JavaScript engine, rendering engine, end-cloud-core acceleration, emerging scenarios, and so on.

In terms of interactive experience, resource consumption, and stability, the quick application implements an effective combination of the front-end development mode and the native rendering and platform capabilities by introducing native rendering paths.

Unlike other cross-platform frameworks at the application layer, the quick application is rooted in the operating system of the electronic device and may achieve deep integration between the chip, the operating system and the cloud. Using the combination of the end and the cloud to enable performance acceleration as an example, through the collaborative rendering of the cloud and the end, the optimization of a network link layer may greatly accelerate the enabling speed of the quick application. At the same time, the unique capabilities of the hardware platform may be integrated to further enhance the experience. For example, the AI chip of the electronic device may be used to integrate the computing power of a neural-network processing unit (NPU, a network processor) into the quick application engine, so that an AI scenario (face recognition, image super resolution, etc.) may be executed on the end side with low time delay and high performance, while effectively protecting user privacy and saving bandwidth.

Figure 13:
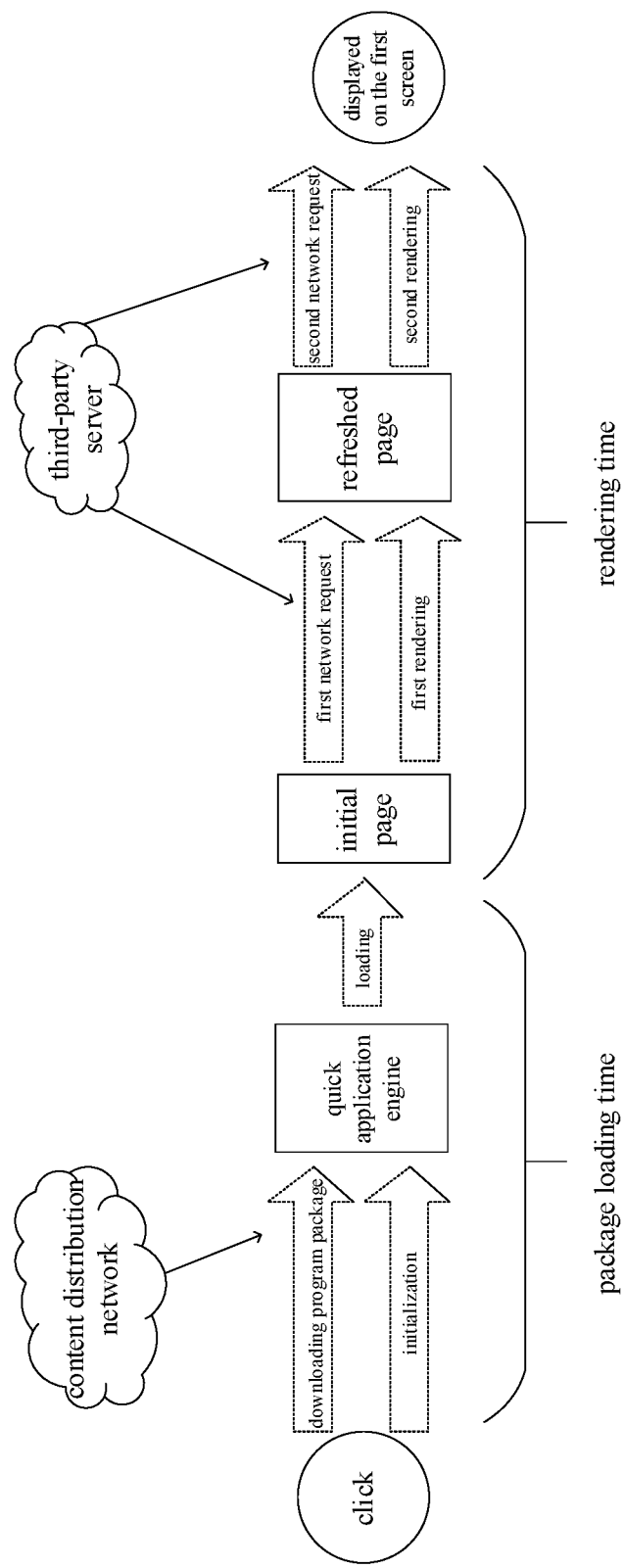
FIG. 13 is a flowchart of enabling a quick application according to an example.

FIG. 13 is a flowchart of enabling a quick application according to an example of the present disclosure, and includes the following.

1) At the first enabling, the user clicks on the package that triggers the download of the quick application, and simultaneously starts work related to the initialization of the quick application engine. After the quick application package is downloaded and verified, the JavaScript file of the first page that needs to be displayed will be loaded and rendered.

2) Page rendering includes JavaScript loading, execution of page and JavaScript framework logics, layout calculations, and finally, drawing of native UI controls. There will be one or more network requests when the logics in the page are executed. A data-driven page returned by the network request(s) will be re-rendered until the content of the first screen page is fully displayed.

The network request(s), JavaScript execution, typesetting, and drawing here are not in a simple serial connection, but are intertwined in parallel, which affect the rendering performance of the entire page, and are highly related to the page design logic, network status, and device operation status.

Due to the special nature of the quick application, the quick application is expected to complete more tasks and achieve more functions. At present, functions of the quick application are gradually being improved. The example of the present disclosure provides a new function of the quick application. The new function is used to receive the search request from other applications, and display the card data of the quick application based on the search request. Consequently, the functions of the quick application are expanded, and the processing capability and practicability of the quick application are improved.

Figure 14:
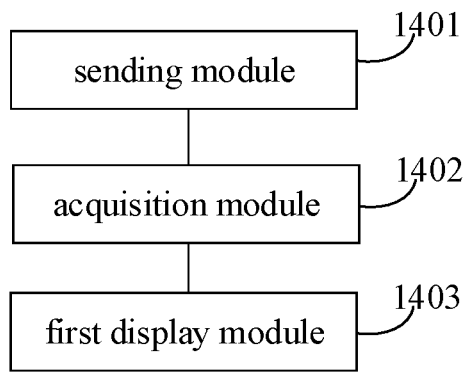
FIG. 14 is a schematic diagram of a card data display apparatus according to an example.

FIG. 14 is a schematic diagram of a card data display apparatus according to an example. The card data display apparatus is integrated in the terminal. Referring to FIG. 14, the apparatus includes a sending module 1401, an acquisition module 1402 and a first display module 1403.

The sending module 1401 is configured to, in response to receiving a search request through a first application, send the search request to a second application.

The acquisition module 1402 is configured to acquire card data in response to receiving the search request through the second application. The card data includes a first search result corresponding to the search request.

The first display module 1403 is configured to display the card data.

In the apparatus provided by the example of the present disclosure, in response to receiving the search request through the first application, the terminal sends the search request to the second application. In response to receiving the search request through the second application, the terminal acquires the card data and displays the card data. The example of the present disclosure provides a manner to display the card data based on the search request. The user may trigger the search request in the first application to view the card data acquired by the second application based on the search request, which improves the flexibility of displaying the card data. In addition, the user may view the card data of the second application without manually enabling the second application, thereby simplifying operations and improving convenience.

Figure 15:
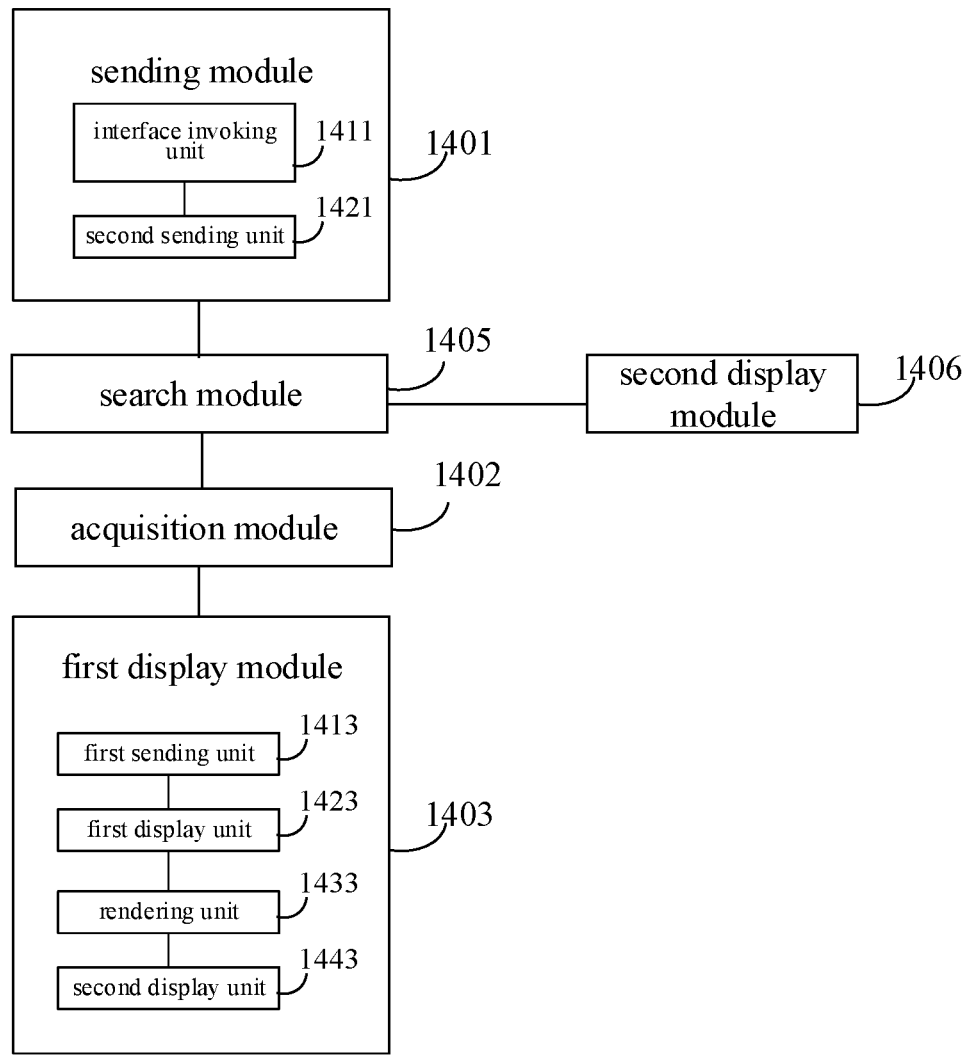
FIG. 15 is a schematic diagram of a card data display apparatus according to another example.

In a possible implementation, referring to FIG. 15, the first display module 1403 includes a first sending unit 1413 and a first display unit 1423.

The first sending unit 1413 is configured to send the card data to the first application through the second application.

The first display unit 1423 is configured to, in response to receiving the card data through the first application, display the card data.

In another possible implementation, the first display unit 1423 is further configured to, in response to receiving the card data through the first application, perform rendering based on the card data to obtain a first search result interface, and display the first search result interface.

In another possible implementation, the apparatus further includes a search module 1404 and the first display unit 1423.

The search module 1404 is configured to, in response to receiving the search request through the first application, perform search based on the search request to obtain a second search result.

The first display unit 1423 is further configured to perform rendering based on the card data and the second search result to obtain a second search result interface, and to display the second search result interface.

In another possible implementation, the second application is a quick application. The sending module 1401 includes an interface invoking unit 1411.

The interface invoking unit 1411 is configured to invoke an interface provided by the quick application through the first application, and to send the search request to the quick application.

In another possible implementation, the search request carries a search keyword, and the card data includes the first search result corresponding to the search keyword; or, the search request carries a user identifier for logging in to the first application and the search keyword, and the card data includes the user identifier and the first search result corresponding to the search keyword.

In another possible implementation, the sending module 1401 includes a second sending unit 1421.

The second sending unit 1421 is configured to, in response to receiving the search request through the first application, determine the second application associated with the search keyword, and send the search request to the second application.

In another possible implementation, the apparatus further includes the search module 1404, a second display module 1405 and the first display module 1403. The first display module 1403 includes a rendering unit 1433 and a second display unit 1443.

The search module 1404 is further configured to, in response to receiving the search request through the first application, perform search based on the search request to obtain a second search result.

The second display module 1405 is configured to perform rendering based on the second search result to obtain a third search result interface, and to display the third search result interface.

The rendering unit 1433 is configured to perform, through the second application, rendering based on the card data to obtain a fourth search result interface.

The second display unit 1443 is configured to, in response to the third search result interface being in a displayed state, display the fourth search result interface.

In another possible implementation, the third search result interface includes a hollow area, and the fourth search result interface is located in the hollow area; or, the fourth search result interface is suspended over the third search result interface and blocks a designated area of the third search result interface.

It should be noted that when displaying the card data, the card data display apparatus provided in the foregoing example is described by taking only the division of the above functional modules as an example. In practical applications, the above functions may be allocated to different functional modules as required for implementation. That is, the internal structure of the terminal is divided into different functional modules to complete all or part of the functions described above. In addition, the card data display apparatus and the card data display method provided by the foregoing examples belong to the same concept. For specific implementation processes, reference may be made to the method examples, and details will not be described herein again.

Figure 16:
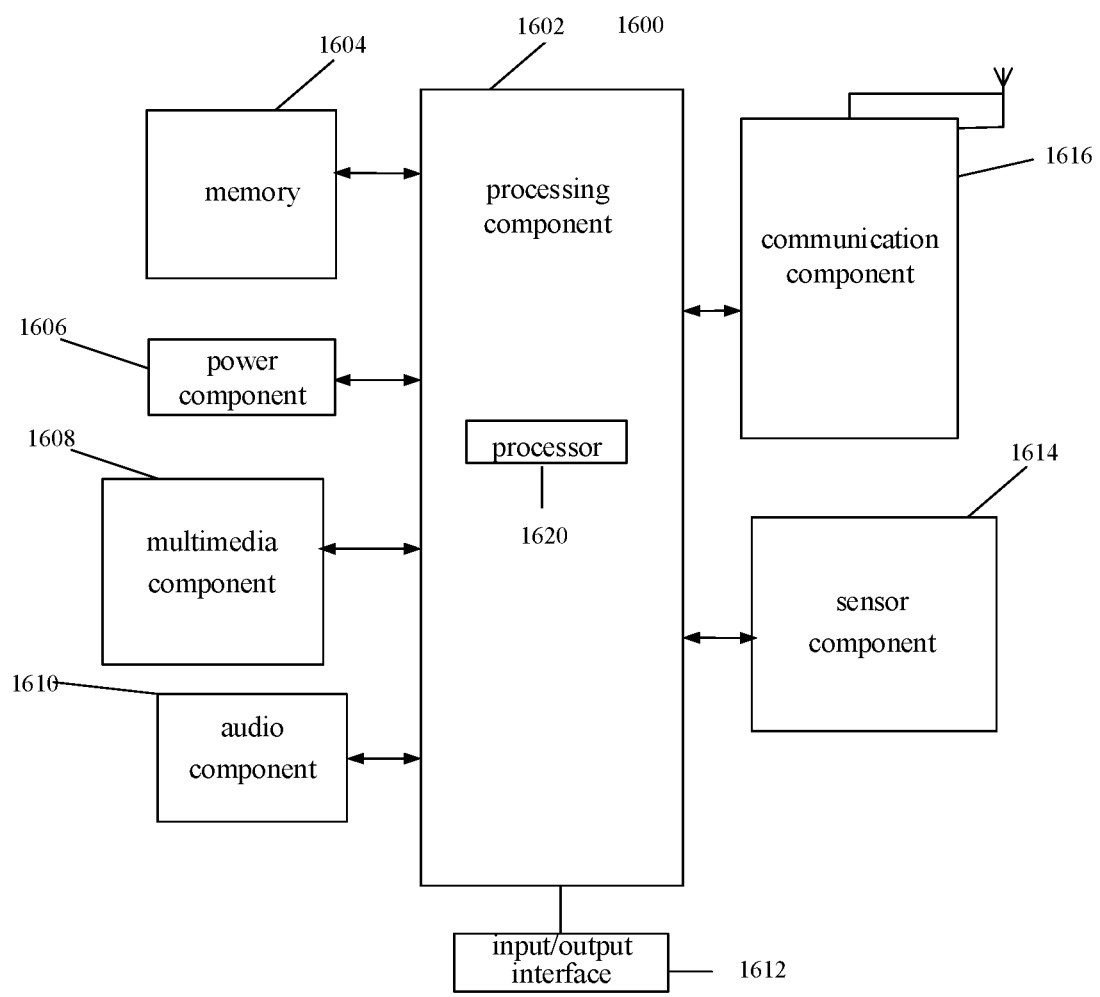
FIG. 16 is a block diagram of an electronic device according to an example.

FIG. 16 is a block diagram of an electronic device according to an example. For example, the electronic device 1600 may be a mobile phone, a computer, a digital broadcast terminal, a messaging device, a game console, a tablet device, a medical device, an exercise device, a personal digital assistant, and so on.

Referring to FIG. 16, the electronic device 1600 may include one or more of the following components: a processing component 1602, a memory 1604, a power component 1606, a multimedia component 1608, an audio component 1610, an input/output (I/O) interface 1612, a sensor component 1614, and a communication component 1616.

The processing component 1602 normally controls the overall operation (such as operations associated with displaying, telephone calls, data communications, camera operations and recording operations) of the electronic device 1600. The processing component 1602 may include one or a plurality of processors 1620 to execute instructions so as to perform all or part of the steps of the above described method. In addition, the processing component 1602 may include one or a plurality of units to facilitate interactions between the processing component 1602 and other components. For example, the processing component 1602 may include a multimedia unit to facilitate interactions between the multimedia component 1608 and the processing component 1602.

The memory 1604 is configured to store various types of data to support operations at the electronic device 1600. Examples of such data include instructions for any application or method operated on the electronic device 1600, contact data, phone book data, messages, images, videos and the like. The memory 1604 may be realized by any type of volatile or non-volatile storage devices, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 1606 provides power to various components of the electronic device 1600. The power component 1606 may include a power management system, one or a plurality of power sources and other components associated with power generation, management, and distribution of the electronic device 1600.

The multimedia component 1608 includes a screen that provides an output interface between the electronic device 1600 and the user. In some examples, the screen may include a liquid crystal display (LCD) and a touch panel (TP). If the screen includes a touch panel, the screen may be implemented as a touch screen to receive input signals from the user. The touch panel includes one or a plurality of touch sensors to sense touches, slides, and gestures on the touch panel. The touch sensor may sense not only the boundary of the touches or sliding actions, but also the duration and pressure related to the touches or sliding operations. In some examples, the multimedia component 1608 includes a front camera and/or a rear camera. When the electronic device 1600 is in an operation mode such as a shooting mode or a video mode, the front camera and/or the rear camera may receive external multimedia data. Each front camera and rear camera may be a fixed optical lens system or have a focal length and an optical zoom capability.

The audio component 1610 is configured to output and/or input an audio signal. For example, the audio component 1610 includes a microphone (MIC) that is configured to receive an external audio signal when the electronic device 1600 is in an operation mode such as a call mode, a recording mode, and a voice recognition mode. The received audio signal may be further stored in the memory 1604 or transmitted via the communication component 1616. In some examples, the audio component 1610 further includes a speaker for outputting audio signals.

The I/O interface 1612 provides an interface between the processing component 1602 and a peripheral interface unit. The peripheral interface unit may be a keyboard, a click wheel, a button and so on. These buttons may include, but are not limited to, a home button, a volume button, a start button, and a locking button.

The sensor assembly 1614 includes one or a plurality of sensors for providing the electronic device 1600 with various aspects of status assessments. For example, the sensor component 1614 may detect an open/closed state of the electronic device 1600 and a relative positioning of the components. For example, the components may be a display and a keypad of the electronic device 1600. The sensor component 1614 may also detect a change in position of the electronic device 1600 or a component of the electronic device 1600, the presence or absence of contact of the user with the electronic device 1600, the orientation or acceleration/deceleration of the electronic device 1600 and a temperature change of the electronic device 1600. The sensor component 1614 may include a proximity sensor configured to detect the presence of nearby objects without any physical contact. The sensor component 1614 may also include a light sensor (such as a CMOS or a CCD image sensor) for use in imaging applications. In some examples, the sensor component 1614 may further include an acceleration sensor, a gyro sensor, a magnetic sensor, a pressure sensor, or a temperature sensor.

The communication component 1616 is configured to facilitate wired or wireless communication between the electronic device 1600 and other devices. The electronic device 1600 may access a wireless network based on a communication standard such as Wi-Fi, 2G or 3G, or a combination thereof. In an example, the communication component 1616 receives broadcast signals or broadcast-associated information from an external broadcast management system via a broadcast channel. In an example, the communication component 1616 further includes a near field communication (NFC) unit to facilitate short range communication.

In an example, the electronic device 1600 may be implemented by one or a plurality of application specific integrated circuits (ASICs), digital signal processors (DSPs), digital signal processing devices (DSPDs), programmable logic devices (PLDs), field programmable gate arrays (FPGA), controllers, microcontrollers, microprocessors, or other electronic components, so as to perform the above card data display method.

In an example, there is also provided a non-transitory computer readable storage medium including instructions. When the above instructions are executed by the processor 1620 in the electronic device 1600, the electronic device 1600 may perform operations run in the card data display method described in the above examples. For example, the non-transitory computer readable storage medium may be a ROM, a random access memory (RAM), a CD-ROM, a magnetic tape, a floppy disk, an optical data storage device, etc.

Examples of the present disclosure further provide a computer-readable storage medium having at least one instruction stored thereon. The at least one instruction is loaded and executed by a processor to implement the operations performed in the card data display method as described in the above examples.

Examples of the present disclosure also provide a computer program. The computer program stores at least one instruction. The instruction is loaded and executed by a processor to implement the operations performed in the card data display method as described in the above examples.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other examples of the present disclosure will be apparent to those skilled in the art after considering the specification and practicing the present disclosure disclosed herein. The present disclosure is intended to cover any variations, uses or adaptive changes of the present disclosure, which are in accordance with general principles of the present disclosure and include common knowledge or technical means in the art that are not disclosed herein. The specification and examples are to be regarded as illustrative only, and the real scope and spirit of the present disclosure are pointed out in the attached claims.

It should be understood that the present disclosure is not limited to the precise structures described above and illustrated in the drawings, and various modifications and changes may be made without departing from the scope thereof. The scope of the present disclosure is merely limited by the attached claims.

What is claimed is:

1. A card data display method, comprising:
in response to receiving a search request in a first application, sending the search request to a second application;
acquiring card data in the second application in response to receiving the search request, wherein the card data comprises a first search result corresponding to the search request; and
displaying the card data;
wherein in response to receiving the search request in the first application, sending the search request to the second application comprises:
in response to receiving the search request in the first application, acquiring a search keyword carried by the search request;
determining a target type tag associated with the search keyword from a plurality of type tags, wherein the plurality of type tags are configured to describe types of a plurality of applications other than the first application;
determining an application corresponding to the target type tag as the second application; and
sending the search request to the second application.

2. The method of claim 1, wherein displaying the card data comprises:
sending the card data from the second application to the first application; and
in response to receiving the card data in the first application, displaying the card data.

3. The method of claim 2, wherein in response to receiving the card data in the first application, displaying the card data comprises:
wherein in response to receiving the card data in the first application, performing rendering based on the card data to obtain a first search result interface; and
displaying the first search result interface.

4. The method of claim 2, further comprising:
in response to receiving the search request in the first application, obtaining a second search result based on the search request;
wherein in response to receiving the card data in the first application, displaying the card data comprises:
performing rendering based on the card data and the second search result to obtain a second search result interface; and
displaying the second search result interface.

5. The method of claim 1, wherein the second application is a quick application, and in response to receiving the search request in the first application, sending the search request to the second application comprises:
invoking an interface provided by the quick application in the first application; and
sending the search request to the quick application.

6. The method of claim 1, further comprising:
in response to receiving the search request being a search keyword, acquiring the card data that comprises the first search result corresponding to the search keyword; and
in response to receiving the search request comprising a user identifier for logging into the first application and the search keyword, acquiring the card data that comprises the user identifier and the first search result corresponding to the search keyword.

7. The method of claim 1, further comprising:
in response to receiving the search request in the first application, obtaining a second search result based on the search request; and
performing rendering based on the second search result to obtain a third search result interface, and displaying the third search result interface;
wherein displaying the card data comprises:
performing, in the second application, the rendering based on the card data to obtain a fourth search result interface; and
in response to the third search result interface being in a displayed state, displaying the fourth search result interface.

8. The method of claim 7, wherein the third search result interface comprises a hollow area, and the fourth search result interface is located in the hollow area.

9. The method of claim 7, wherein the fourth search result interface is suspended over the third search result interface and blocks a designated area of the third search result interface.

10. The card data display apparatus, comprising:
one or more processors;
one memory storing instructions executable by the one or more processors;
wherein the one or more processors are configured to:
in response to receiving a search request in a first application, send the search request to a second application;
acquire card data in the second application in response to receiving the search request, wherein the card data comprises a first search result corresponding to the search request; and
display the card data;
wherein one or more processors are configured to:
in response to receiving the search request in the first application, acquire a search keyword carried by the search request;
determine a target type tag associated with the search keyword from a plurality of type tags, wherein the plurality of type tags are configured to describe types of a plurality of applications other than the first application;
determine an application corresponding to the target type tag as the second application; and
send the search request to the second application.

11. The card data display apparatus of claim 10, wherein the one or more processors are configured to:
send the card data from the second application to the first application; and
in response to receiving the card data in the first application, display the card data.

12. The card data display apparatus of claim 11, wherein the one or more processors are further configured to, in response to receiving the card data in the first application, perform rendering based on the card data to obtain a first search result interface, and display the first search result interface.

13. The card data display apparatus of claim 11, wherein the one or more processors are configured to:
   in response to receiving the search request in the first application, obtain a second search result based on the search request;
   perform rendering based on the card data and the second search result to obtain a second search result interface; and
   display the second search result interface.

14. The card data display apparatus of claim 10, wherein the second application is an installation-free application, and the one or more processors are configured to:
   invoke an interface provided by the installation-free application in the first application; and
   send the search request to the installation-free application.

15. The card data display apparatus of claim 10, wherein the one or more processors are further configured to:
   in response to receiving the search request being a search keyword, and the card data comprises the first search result corresponding to the search keyword; and
   in response to receiving the search request comprising a user identifier for logging in to the first application and the search keyword, and the card data comprises the user identifier and the first search result corresponding to the search keyword.

16. The card data display apparatus of claim 10, wherein one or more processors are configured to:
   in response to receiving the search request in the first application, obtain a second search result based on the search request;
   perform rendering based on the second search result to obtain a third search result interface, and to display the third search result interface;
   perform in the second application, the rendering based on the card data to obtain a fourth search result interface; and
   in response to the third search result interface being in a displayed state, display the fourth search result interface.

17. The card data display apparatus of claim 16, wherein the third search result interface comprises a hollow area, and the fourth search result interface is located in the hollow area; or,
   the fourth search result interface is suspended over the third search result interface and blocks a designated area of the third search result interface.

18. A computer-readable storage medium having at least one instruction stored thereon, wherein the at least one instruction is loaded and executed by a processor to implement a card data display method, and the method comprises:
   in response to a receiving search request in a first application, sending the search request to a second application;
   acquiring card data in the second application in response to the receiving search request, wherein the card data comprises a first search result corresponding to the search request; and
   displaying the card data;
   wherein in response to receiving the search request in the first application, sending the search request to the second application comprises:
   in response to receiving the search request in the first application, acquiring a search keyword carried by the search request;
   determining a target type tag associated with the search keyword from a plurality of type tags, wherein the plurality of type tags are configured to describe types of a plurality of applications other than the first application;
   determining an application corresponding to the target type tag as the second application; and
   sending the search request to the second application.

* * * * *